Dec. 8, 1959 C. R. SMITH 2,916,365
BARBECUE FUEL AND PREPARATION THEREOF
Filed June 25, 1957

Inventor.
Charles R. Smith.
by H.J. Sanders
Attorney.

United States Patent Office 2,916,365
Patented Dec. 8, 1959

2,916,365
BARBECUE FUEL AND PREPARATION THEREOF
Charles R. Smith, Cassopolis, Mich.
Application June 25, 1957, Serial No. 667,832
2 Claims. (Cl. 44—41)

This invention relates to a prepared fuel particularly adapted for use in barbecuing meats and it may be prepared and used either indoors or outdoors, and while particularly for use as a barbecue fuel is capable of a variety of other uses such as grilling steaks, chops, etc. and for general heating purposes if desired.

An important detail in properly barbecuing meats is to impart a palatable flavor to the food and this is not always accomplished—in fact, it is seldom accomplished by inexperienced cooks or by cooks who must use a fuel that is lacking in the quality of imparting the desired flavor to the food and without the proper fuel it is impossible to accomplish the desired result; and it is the prime purpose of the instant invention to provide a fuel that just "cannot miss" when it comes to imparting flavor and, further, it is readily possible as I have found out by experience to vary the flavor by what may appear to be slight but which in reality are found to be very important alterations in the fuel composition or proportions of constituents used.

One object is to provide a fuel that in its manufacture has been so prepared and processed that in its use it will be so consumed in the cooking of the food that a very palatable product will result and one that will have the particular flavor desired—whether or not the cook has the experience ordinarily necessary to accomplish a similar result.

A further object is to provide a barbecuing fuel that is inexpensive to manufacture, that is not dangerous to use, that is easily handled and that may be used in a conventional type of pit and on grills, broilers, rotary type devices, that cooks quicker, ignites easier, etc.

To the foregoing and other ends the invention will be made apparent from the following description, defined in the claims and illustrated in the accompanying drawings forming part of this disclosure, and wherein:

Figure 1:
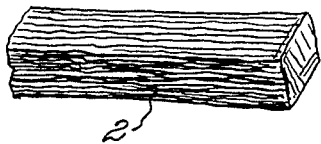
Fig. 1 is a view in perspective of a piece of thoroughly dried out wood fuel employed.

The reference numeral 1 denotes the grate or support for the fuel in a barbecue pit or other barbecue cooker so supported and formed as to permit air circulation therethrough and through the fuel to permit and/or facilitate combustion, to effect cooking of the barbecue meats. Suitably arranged upon the grate 1 are a plurality of sticks, blocks or short pieces of wood 2 which have been thoroughly dried out and thereafter placed in a wire mesh basket or container of suitable size and the container then immersed for a fraction of a minute in a vat, tank or other container of a cooked starch or carbohydrate and water solution, desirably polysaccharide $(C_6H_{10}O_5)_x$ to coat said blocks with a solution.

Figure 2:
Fig. 2 is a view of the wood fuel after it is properly coated and and read for burning.
Figure 3:
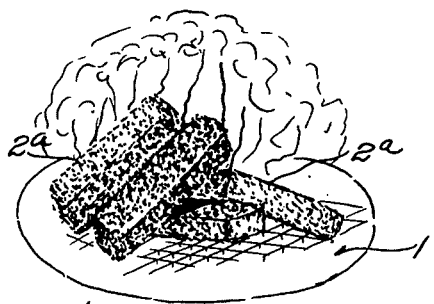
Fig. 3 is a view of several sticks of pieces of the fuel disposed upon a grate and ignited.
Figure 4:
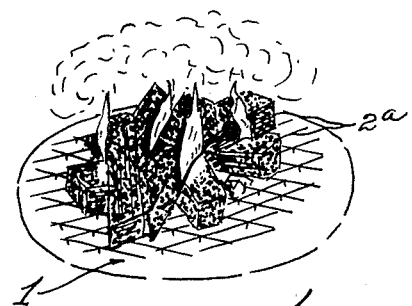
Fig. 4 is a view of the fuel shortly after the ignition and partial burning of same.
Figure 5:
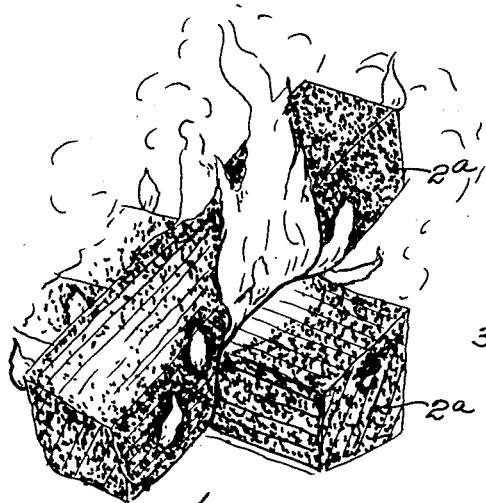
Fig. 5 is a view of the fire after the gases have been and fuel have been further burned and it is an enlargement of Fig. 4, and, Fig. 6 is a view showing the live red, glowing, slow burning embers which finish the cooking process.
Figure 6:
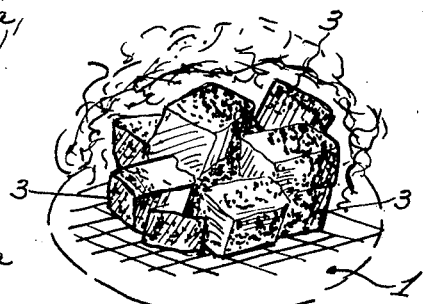

This basket is permitted to remain in the solution for a fraction of a minute, or for a period of but a few seconds, from six to ten seconds desirably, and then removed and permitted to drain back into the carbohydrate solution for a few seconds. This treatment causes the wood fuel to become coated with the solution as best shown at 2a, Fig. 2. The fuel pieces are now removed from the container and placed in a suitable rotary drum or the like containing a quantity of dry, pulverized charcoal and the drum rotated manually or otherwise, causing the fuel pieces to be tumbled about and thoroughly coated by the charcoal which adheres to the fuel peripheries. The fuel pieces are now removed from the vat and spread out in the sun, upon a suitable surface, for drying, or drying may be accomplished by means of a mechanical dryer of most any type. When dried the coating of starch and pulverized charcoal hardens thus furnishing a fuel excellently adapted for the purposes intended.

The purpose of the starch coating of the fuel is to seal the pores in the wood pieces and so prevent air from getting into the wood interior and to bind or hold the charcoal coating, to prevent the wood pieces from burning too rapidly which would result in faulty cooking of the meats, and further, the slower combustion helps filter and clean the flames, making them soot free so that the meat may be kept clean as it is cooked.

When igniting the fuel a small quantity of paper is used to readily heat the fuel pieces thus generating gases from the same and as the interior of the fuel pieces become heated beyond a certain point the resulting gases will escape and be consumed and combining with the burning charcoal will produce a bluish wood, wood-gas flame that cooks the meat while the wood smoke will flavor the food. The flame from the wood sticks will burn, not too rapidly, and consume the coatings and gases until same have been completely burned out of the wood. The live embers will continue to burn, similar to ordinary charcoal, until the meats are cooked and the desired flavor imparted thereto. Different flavors, as desired, may be imparted to the foods by using different types of wood, such as ash, cedar, walnut, oak, etc. If desired, another method of coating the fuel pieces is to first add fine charcoal and cooked starch solution to form a mixture into which the fuel sticks or blocks are submerged and thereafter allowed to drain and dry, after removal. As a substitute for starch, tragacanth gum may be employed or it may be combined with starch.

What is claimed is:
1. A process of manufacturing a slow burning barbecue fuel, comprising the steps of accumulating a plurality of relatively short blocks of wood that have been thoroughly dried, submerging said blocks of wood into a cooked starch and water solution for a fraction of a minute, allowing said cooked starch and water solution to partially drain from the blocks after they have been withdrawn from the solution to obtain a thin starch coating upon said blocks, mingling said starch-coated blocks with pulverized combustible charcoal so as to cause a thick blended coating of starch and charcoal to adhere to the exterior surface of said blocks and seal the pores thereof, and drying the blocks allowing said blended coating of starch and charcoal to harden thereon, thereby obtaining a slow burning barbecue fuel.

2. A barbecue fuel comprising a block of wood, a layer of hardenable liquid starch coating said block and sealing the pores thereof, and a coating of pulverized charcoal blended with said starch coating and held upon said block by said starch; said starch causing a retarded burning action of said block.

References Cited in the file of this patent
UNITED STATES PATENTS

| | | |
|---|---|---|
| 301,210 | Canan | July 1, 1884 |
| 2,341,377 | Hinderer | Feb. 8, 1944 |
| 2,531,828 | Schultz | Nov. 28, 1950 |
| 2,822,251 | Swinehart et al. | Feb. 4, 1958 |